Figure 1:
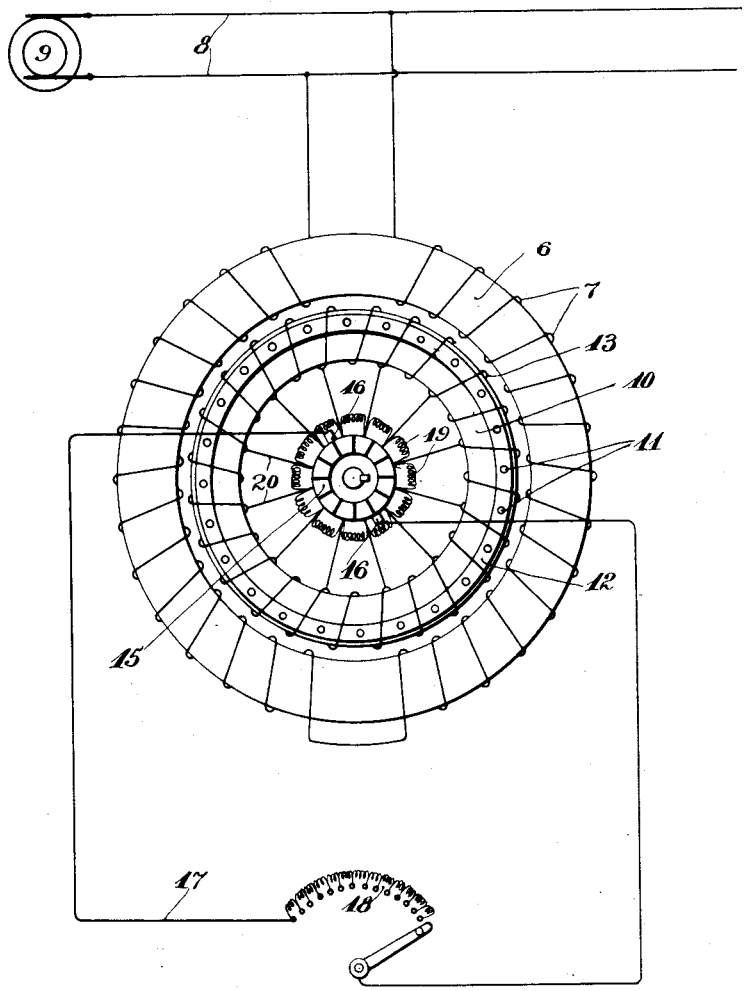

No. 870,035. PATENTED NOV. 5, 1907.
D. C. JACKSON.
DYNAMO ELECTRIC MACHINE.
APPLICATION FILED DEC. 22, 1902.

2 SHEETS—SHEET 1.

WITNESSES
Charles J. Schmidt.
Lynn A. Williams

INVENTOR
Dugald C. Jackson
BY Charles A. Brown
Attorney

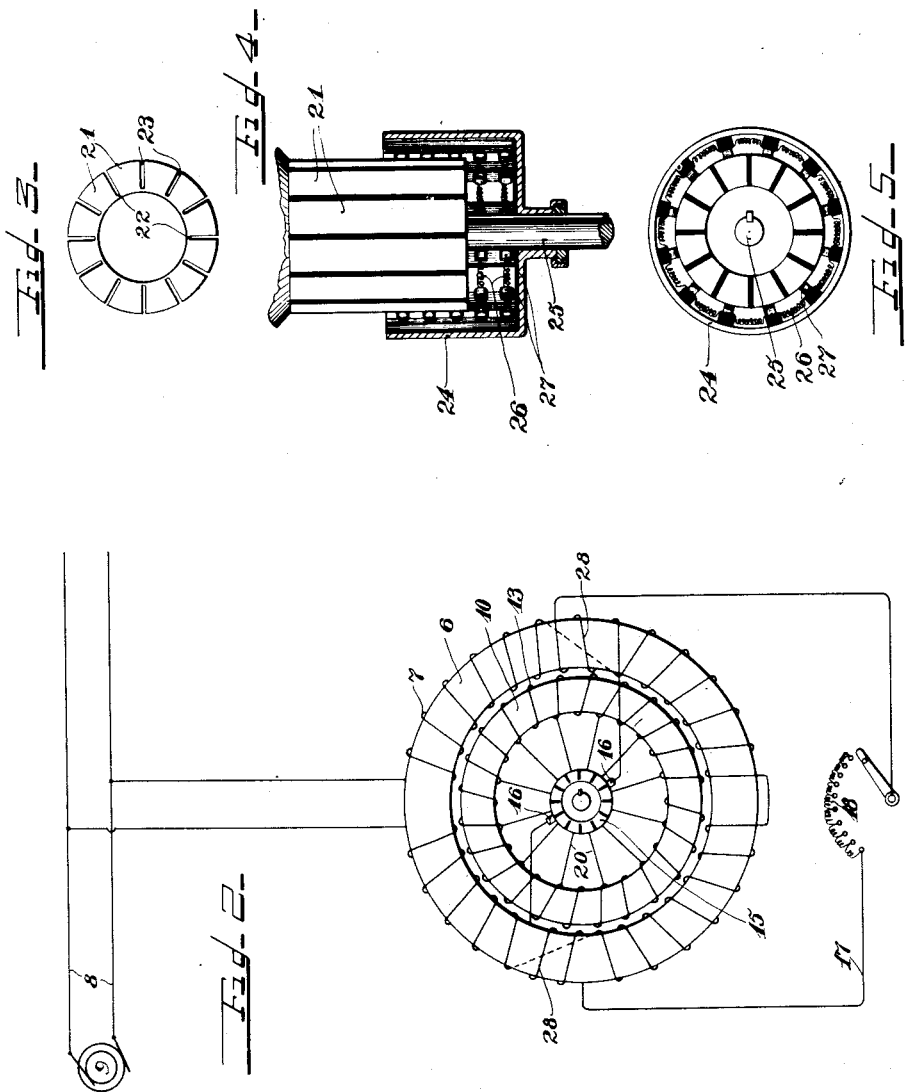

UNITED STATES PATENT OFFICE.

DUGALD C. JACKSON, OF MADISON, WISCONSIN.

DYNAMO-ELECTRIC MACHINE.

No. 870,035.  Specification of Letters Patent.  Patented Nov. 5, 1907.

Application filed December 22, 1902. Serial No. 136,144.

*To all whom it may concern:*

Be it known that I, DUGALD C. JACKSON, a citizen of the United States, residing at Madison, in the county of Dane and State of Wisconsin, have invented a certain new and useful Improvement in Dynamo-Electric Machines, of which the following is a full, clear, concise, and exact description, reference being had to the accompanying drawings, forming a part of this specification.
My invention relates to dynamo electric machines to be used for the generation or translation of pulsating or alternating electric currents.

More particularly, my invention has reference to such machines adapted for use with what are commonly known as single phase alternating currents. Polyphase alternating currents have been used with considerable success for the transmission of alternating currents for power purposes, but on account of the number of electrical conductors required there is an advantage in utilizing single phase alternating currents for power purposes. Furthermore, it is frequently desirable to run an electric motor from the single phase alternating current mains used largely for supplying current to electric lighting systems. The general simplicity of a single phase system makes it desirable to provide a satisfactory single phase, self-starting induction motor of good regulation.

An induction motor such as is commonly employed when polyphase currents are available will run when supplied with a single phase alternating current, but such a motor must be started and brought partially to full speed by some outside means.

My invention has for one of its objects the provision of a motor which may be operated by currents supplied from a single phase alternating current system and which at the same time will be self-starting.

In order to make such a motor self-starting, it has been proposed to wind the motor rotor or armature with an auxiliary commutated winding. A pair of brushes, when properly brought into contact with the commutator of such a winding, and when suitably connected, serve to throw the currents and corresponding poles induced in the armature out of equilibrium with the poles set up in the field winding, and thereby cause a starting torque upon what is frequently known as the repulsion principle. In addition to the commutated winding, such motors have been provided with a closed circuit or squirrel cage winding, such as is common in induction motors. This squirrel cage winding may be utilized to provide for the normal operation of the motor after it has been brought up to speed by the commutated winding. The use of such a commutated winding has given trouble due to the injurious sparking which must result from the fact that the brushes can not be placed in the usual plane of commutation but are placed somewhere between the neutral point and the point of highest potential. In order to prevent such sparking, my invention provides conductors or resistances connecting commutator bars. These resistances connecting adjacent or alternate commutator bars do cause a decrease in the starting torque, but the resistances may be made such that the reduction is immaterial. After the rotor attains its normal speed, the resistances, which, indeed, serve to close the armature coils, provide a secondary closed winding, which, if desired, may act in conjunction with an associated squirrel cage winding to cause the rotation of the motor on the induction principle. By making the connections between adjacent commutator bars of comparatively low resistance, it is possible to allow the auxiliary winding to serve partially as a commutated winding for starting purposes and partially, in conjunction with the interposed resistances, as a closed coil induction motor armature winding; that is, the additional squirrel cage winding *per se* may be done away with. This double use of the commutated winding may be very greatly enhanced in value by providing means for varying the resistance between commutator bars. Thus at starting the adjacent commutator bars may be, if desired, entirely disconnected one from the other except through the commutated winding, and as the motor increases in speed the resistance may be interposed between adjacent commutator bars and thereafter decreased until, indeed, the commutator may be entirely short-circuited, thus producing a short-circuited armature winding. The interposition of such resistances between commutator bars serves to prevent the injurious sparking previously referred to.

The regulation of a motor provided with both an auxiliary commutated winding and a separate closed circuit winding may be excellent. In such a device the advantages of a large torque at starting, due to the reactions of the commutated winding, are combined with the characteristic regulation of the short-circuited induction motor armature winding which regulation is similar to that in a direct current, shunt wound motor. These advantages in regulation, however, may be gained equally well by the use of a single winding provided with a commutator between the bars of which suitable resistances may be connected. In order to vary and control the speed of the motor a variable resistance may be connected in the circuit between the brushes carrying the commutated current. In some cases I find it desirable to bring the conductor connecting the brushes into inductive relation with the motor field winding, whereby the currents through the commutated winding may be modified by the currents induced in the said conductor by the inductive relation to the motor field winding.

I shall more fully explain my invention by reference to the accompanying drawings, in which—

Figure 1 is a diagrammatic representation of a motor constructed in accordance with my invention; Fig. 2 is a modification thereof, showing the use of the inductive relation between the field windings and the conductor connecting the brushes; Fig. 3 is a view showing a desirable modification in the construction of a commutator for use in connection with my motor; Fig. 4 is a view in cross-section illustrating a means for varying the resistance between adjacent commutator bars; Fig. 5 is an end elevation of the same.

I have shown a preferably laminated field ring 6, provided with the usual induction motor field winding 7, which is supplied with alternating current through the mains 8, 8, leading to the alternating current generator 9. As is well understood by those skilled in the art, this winding serves to produce diametrically opposite poles within the ring 6, which poles are of alternating polarity. Mounted to rotate within the ring 6 is the armature 10. In this embodiment of my invention I have shown a closed circuit squirrel cage winding having conductors 11 and end connecting rings 12. In addition to this closed circuit winding the armature is wound with a commutated winding 13, similar to that employed in a direct current Gramme ring armature. This winding is connected at intervals, as shown, with the commutator 15. The brushes 16, 16 serve to connect substantially diametrically opposite sides of the commutator through the conductor 17 in whose circuit there is interposed the variable resistance 18. The resistances 19, 19 are permanently connected between adjacent commutator bars. Thus between adjacent commutator bars there are provided parallel circuits, one through the correspondingly intermediate portion of the commutated winding and the other through the corresponding resistance 19. To the extent of the electrical path afforded through the resistance 19 the commutated winding becomes a closed circuit winding. From still another point of view the winding 13 will be seen to be connected at intervals through the conductors 20, 20 with a closed ring of high resistance.

The operation of my improved motor is as follows: Current being supplied to the field winding 7, poles of alternating polarity are set up in the field ring 6, whereupon currents are induced in the squirrel cage armature winding and in the commutated winding 13. The armature being stationary, the reactions caused by the currents induced in the squirrel cage winding are balanced, tending to cause no resultant rotation of the armature in either direction. The brushes 16, 16, however, being suitably placed between the neutral points and the points of highest potential on the commutator, serve to unbalance with respect to the field magnet the reactions set up by the currents in the commutated winding. These unbalanced reactions serve to cause a rotation of the armature upon what is commonly known as the repulsion principle. The armature being thus set in rotation, the reactions of the short-circuited winding become unbalanced, producing a torque in the same direction as that produced by the reactions of the commutated winding. The motor being thus brought into normal conditions of operation, the resistances 19 interposed between adjacent commutator bars serve to carry the currents which would otherwise cause sparking at the commutator. These resistances, indeed, to the extent of their conductivity, form a closure of the circuit through each coil the commutated winding, thus producing in effect a second closed circuit winding in parallel relation to the usual squirrel cage winding of the armature. The result, then, of this secondary closed winding is an additional torque-producing means acting in harmony and conjunction with the torque produced by the usual squirrel cage winding. The variable resistance 18 serves to regulate and control the current flowing between the brushes 16, 16, whereby the starting torque may be controlled and varied at will, and, indeed, the speed of the motor may be, to a certain extent, controlled by the amount of resistance included between the brushes.

In Fig. 3 I have illustrated a commutator in which the adjacent bars 21, 21 are electrically connected by a web 22 of the metal of which the commutator is formed. Thus the commutator may be formed by cutting suitable slits in a metal tube. This metal may be of comparatively high resistance, if desired. The slits 23, 23 may be left open or filled with suitable insulating material, in order to provide a smooth running surface for the brushes bearing upon the commutator.

In Figs. 4 and 5 I have illustrated a means for varying the resistances interposed between various commutator segments. I have illustrated a spider 24, splined upon the armature shaft 25 to rotate therewith. Suitable resistances 26 are connected between brushes 27 mounted on the spider 24. By adjusting the position of the spider and its associated brushes and resistances longitudinally with respect to the armature shaft, the amount of resistance interposed between adjacent commutator bars may be varied at will. By entirely removing the spider from its association with the commutator, the resistances between the bars may be entirely removed. The alternate position of the spider may be arranged to produce a dead short-circuit between commutator bars, thus serving to short-circuit the commutated winding.

In Fig. 2 I have illustrated a modification of Fig. 1, in which the squirrel cage winding is entirely dispensed with, the commutated winding being connected with a continuous ring of metal of suitable resistance to provide in addition to the short-circuiting path for the armature coils a commutator for the commutation of sufficient current for the purpose of the necessary starting torque. The single winding in this case thus performs the double function of both the closed circuit and the auxiliary winding shown in Fig. 1. In Fig. 2 I have also shown auxiliary field coils 28, 28, wound on the field frame 6 in inductive relation to the primary field winding 7. These coils 28 constitute an auxiliary or supplemental field winding serving to influence the amount of current traversing the auxiliary armature winding and thereby influencing the operation of the machine. It will be seen that in these embodiments of my invention I have shown a plurality of closed circuits corresponding in number with the armature coils, each closed circuit including in series an armature coil, a resistance, and the armature connections with the commutator between which the resistance intervenes, the resistance thus bridging the commutator segments and forming with respect to adjacent commutator bars a second electrical path in parallel relation with the associated armature coil. It will be apparent that a brush bearing upon the commutator between the connections of the corresponding armature coil with the commutator is also put into parallel relation with the armature coil and the associated resistance.

I have particularly described my invention with reference to a single phase system of power distribution, a two pole inducing field and two brushes being indicated to correspond with such conditions. Obviously, the number of brushes may be varied, as desired, in accordance with the number of phases of current in the transmission circuit and the number of poles in the machine. Furthermore, I have described my invention with particular reference to a motor adapted to be operated by currents supplied from an alternating current transmission line. It will be apparent, however, that my invention may readily be applied to alternating current generators.

I have described an embodiment of my invention in which the commutated armature winding is in the form of a closed coil Gramme ring winding. Any other suitable form of commutated winding may be employed, such as a well known progressive winding or an open coil winding, such as is frequently used in generators for supplying current to arc lighting circuits.

I have herein shown and particularly described the preferred embodiment of my invention, but I do not wish to limit myself to the precise construction and arrangement herein shown, as modifications therein may readily be made by those skilled in the art, without departing from the spirit of my invention.

What I claim as my invention and desire to secure by Letters Patent is:

1. In a dynamo electric machine, the combination with an armature winding, of a commutator therefor, said commutator having an integral conductor of high resistance and a contact surface for brushes, connected with said winding and with said high resistance conductor.

2. In a system of electrical power transmission, the combination with a source of alternating current, of a motor receiving current from said source, the armature of said motor having a commutated winding, and an associated commutator therefor, said commutator having an integral conductor of high resistance and a contact surface for brushes connected with said commutated winding and with said high resistance conductor.

3. In a dynamo electric machine, the combination with an armature winding, of a commutator therefor, said commutator comprising an integral ring conductor connected with said winding, and brushes in electrical connection with said ring conductor.

4. In a system of electrical power transmission, the combination with a source of alternating current, of a motor receiving current from said source, the armature of said motor having a commutated winding, and a commutator for said winding, said commutator comprising an integral ring conductor connected with said winding, and brushes in electrical connection with said ring conductor.

5. In a system of power transmission, the combination with a source of alternating current, of a motor in circuit therewith, the said motor having its armature provided with a short-circuited and a commutated winding, a commutator for said commutated winding, said commutator having an integral conductor of high resistance and a contact surface for brushes connected with said winding and with said high resistance conductor, brushes for engaging said commutator, and an auxiliary field winding in circuit with said brushes and the commutated winding, substantially as described.

6. In a system of power transmission, the combination with a source of alternating current, of a motor in circuit therewith, the said motor having its armature provided with a short-circuited and a commutated winding, a commutator for said commutated winding, said commutator comprising an integral ring conductor connected with said winding, brushes for engaging said commutator, and a circuit for impressing upon the brushes an electromotive force of the frequency of said source.

7. In a system of power transmission, the combination with a source of alternating current, of a motor in circuit therewith, the said motor having its armature provided with a short-circuited and a commutated winding, a commutator therefor, said commutator having an integral conductor of high resistance and a contact surface for brushes connected with said commutated winding and with said high resistance conductor, brushes bearing on the contact surface of said commutator, an external circuit connecting said brushes, and a suitable controller in said external circuit.

8. In a system of power transmission, the combination with a source of alternating current, of the field magnet of a motor in circuit with said source, an armature for said motor, a winding on said armature, a commutator therefor, said commutator comprising an integral ring conductor connected with said winding, brushes in electrical connection with said ring conductor at points intermediate between the neutral plane and the plane of commutation, and an external electrical circuit joining said brushes.

9. In an alternating current dynamo electric machine, the combination with a field magnet, of an armature provided with a commutated winding, a commutator therefor, said commutator having an integral conductor of high resistance and a contact surface for brushes connected with said winding and with said high resistance conductor, brushes bearing on said commutator at points intermediate between the neutral plane and the plane of commutation, and an external circuit to which said brushes are connected.

In witness whereof, I hereunto subscribe my name this seventeenth day of December A. D., 1902.

DUGALD C. JACKSON.

Witnesses:
LYNN A. WILLIAMS,
HARVEY L. HANSON.